S. P. FORSEE, Jr.
CREEPER FOR HORSESHOES, &c.
APPLICATION FILED OCT. 20, 1916.
1,235,127.
Patented July 31, 1917.
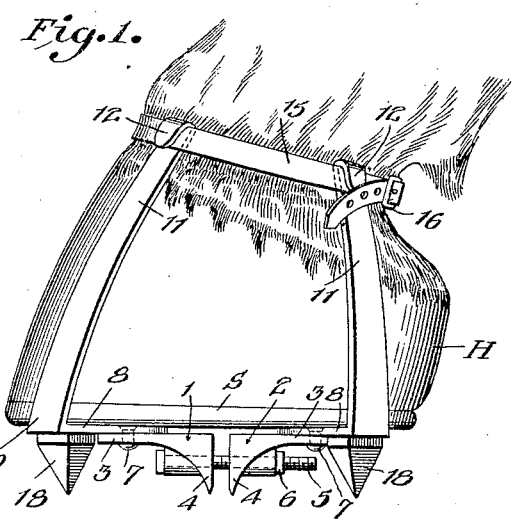
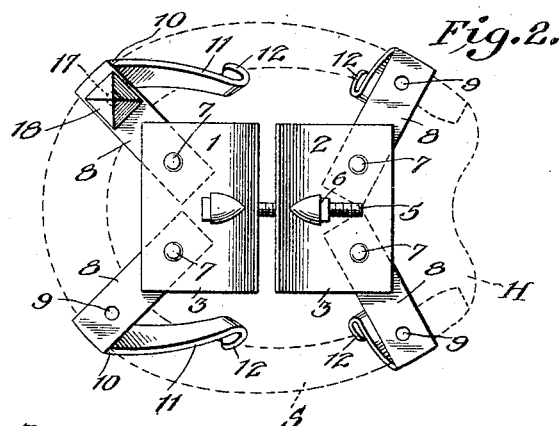
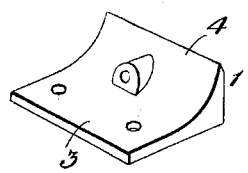
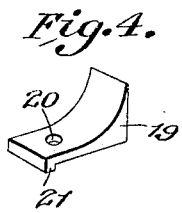
Inventor
Samuel P. Forsee, Jr.
By Mason Fenwick Lawrence,
Attorneys

UNITED STATES PATENT OFFICE.

SAMUEL P. FORSEE, JR., OF KANSAS CITY, MISSOURI.

CREEPER FOR HORSESHOES, &c.

1,235,127. Specification of Letters Patent. Patented July 31, 1917.

Application filed October 20, 1916. Serial No. 126,810.

*To all whom it may concern:*

Be it known that I, SAMUEL P. FORSEE, Jr., a citizen of the United States, residing at Kansas City, in the county of Jackson and State of Missouri, have invented certain new and useful Improvements in Creepers for Horseshoes, &c.; and I do hereby declare the following to be a full, clear, and exact description of the invention, such as will enable others skilled in the art to which it appertains to make and use the same.

This invention relates to farriery, and more especially it is a creeper intended for application to the hoof of a horse or the like, whether the same is bare or already has a shoe. The creeper is made in two members having contiguous parts which are drawn toward each other beneath the center of the hoof and thereby constitute a main calk, and in addition four other calks are detachably mounted on the arms of the members, so that the whole device presents five points of engaging contact with the slippery earth or ice—all as will be explained hereinafter and as shown in the drawings wherein:—

Figure 1 is a side elevation of a horse's hoof having a shoe, and showing the application of this creeper to the hoof beneath the shoe.

Fig. 2 is an enlarged bottom plan view of the entire creeper excepting the fastening strap, all of the detachable calks being removed but one.

Fig. 3 is an enlarged detail of one of the angular parts, Fig. 4 is an enlarged detail of one form of calk, and Fig. 5 is a detail of another form.

In Fig. 1 of the drawings the hoof is lettered H and an ordinary (smooth) shoe thereon is lettered S. Whether the animal is smooth shod or is not shod at all, it becomes desirable at times to attach to his hoof a creeper, so that he can travel with safety over slippery roads and even on the ice; and it is the purpose of this invention to provide such a creeper which is adjustable to fit hoofs of various sizes and which may be attached whether there is a shoe on the hoof or not, without driving a nail.

Coming now to the details of the invention, the body of this device might be said to be made up of two complementary parts 1 and 2 of angle iron, their upper leaves 3 underlying the hoof and standing in one plane, and their upright leaves 4 depending from the inner edges of their upper leaves, and standing near to and parallel with each other; and through these leaves is passed a tightening device such as a bolt 5 having a nut 6. Obviously there might be more than one of these bolts if desired, but I have thought it necessary to illustrate only one. Upon the upper leaf 3 of each of these parts is pivoted at 7 an arm 8 which projects outward beyond the edge of said leaf, is provided with a threaded hole at 9, beyond this hole it turns upward as at 10 into a hook 11 adapted to pass alongside the hoof and bent inward so as to fit closely against the same, and the bill 12 of this hook is turned outward. There are two such arms for each of the complementary parts 1 and 2, making four arms in all, and around the hoof passes a strap 15 which leads through the bills 12 of the several hooks and under the fetlock, the strap being tightened by any suitable means such as a buckle 16.

In applying the device to the hoof of a horse or similar animal, the nut 6 is run out on the bolt so that the two parts 1 and 2 are perhaps not as close to each other as seen in Fig. 1, then the various arms are turned on their pivots 7 until the hooks 11 pass upward alongside the hoof at points where they will not contact with the animal's leg, and finally the strap 15 is put around these hooks, slipped up into their bills, and tightened. Then the nut 6 is adjusted to draw the upright leaves 4 toward each other, and this puts tension onto the various parts and holds the device in place. The depending edges of said upright leaves now come close to each other and form a large calk standing directly beneath the center of the hoof. Into the several holes 9 have already been or may now be screwed the shanks 17 of pointed calks 18 as seen in Fig. 5, or right-angular calks 19 may be used as shown in Fig. 4. Each of these has a hole 20 for a screw to pass upward and into the hole 9, and each also preferably has a lip 21 to engage over the bend 10 of the arm 8 and prevent the calk from rotating. I do not wish to be limited to the type of calks employed, or their number, but by preference they depend from the arms as far as the leaves 4 of the main parts 1 and 2, with the result that when four calks are used the animal's weight is sustained by five points of contact with the slippery roadway. It will be obvious now that this device can be applied to a hoof whether there is a shoe on it or not, and it is readily removed by loosening up the strap and withdrawing it, then dropping the device off the hoof. Thus is provided a creeper or calk-carrying frame whose use is too well-known to stockmen to require amplification here.

What I claim is:

1. In a creeper for attachment to an animal's hoof, the combination with two substantially L-shaped elements having upper leaves standing in one plane and having depending leaves slightly spaced, a bolt passing through and connecting said depending leaves and having a head bearing against one of the leaves, and a nut on the bolt bearing upon the other leaf; of a pair of arms overlying and pivoted to the upper leaf of each element and extending beyond the same, then turned upward into hooks and the bills of the hooks turned outward, and a strap for encircling the hoof and the hooks within their bills.

2. A calk-carrying creeper of the class described comprising complementary members, each consisting of an angular part having one leaf horizontal and the other leaf depending from the first, two arms overlying and pivoted to the horizontal leaf, extending laterally beyond the same, provided with threaded holes, and then bent upwardly into hooks, and a strap encircling the hoof and engaging all the hooks; combined with means for drawing the depending leaves toward each other, and calks removably engaging the holes of the arms and with their tips depending therefrom to the same extent as the lower edges of said depending leaves.

In testimony whereof I affix my signature.

SAMUEL P. FORSEE, Jr.

Copies of this patent may be obtained for five cents each, by addressing the "Commissioner of Patents, Washington, D. C."